United States Patent [19]

Kessinger, Jr. et al.

[11] Patent Number: 5,744,896
[45] Date of Patent: Apr. 28, 1998

[54] INTERLOCKING SEGMENTED COIL ARRAY

[75] Inventors: Roy Lee Kessinger, Jr., Greenville; Paul Anthony Stahura, South Bend; Paul Eric Receveur, New Albany, all of Ind.; Karl David Dockstader, Prospect, Ky.

[73] Assignee: Visual Computing Systems Corp., Greenville, Ind.

[21] Appl. No.: 651,973

[22] Filed: May 21, 1996

[51] Int. Cl.⁶ .................................................. H02K 1/22
[52] U.S. Cl. ...................... 310/268; 310/211; 310/198; 310/208; 310/68
[58] Field of Search .................................. 310/268, 211, 310/198, 208, 68 R, 46, 206, 207, 248

[56] References Cited

U.S. PATENT DOCUMENTS

| | | | |
|---|---|---|---|
| 3,700,944 | 10/1972 | Heintz | 310/168 |
| 3,790,835 | 2/1974 | Takeda | 310/268 |
| 3,988,024 | 10/1976 | Watanabe et al. | 274/1 E |
| 3,999,092 | 12/1976 | Whiteley | 310/156 |
| 4,068,143 | 1/1978 | Whiteley | 310/268 |
| 4,361,776 | 11/1982 | Hayashi et al. | 310/268 |
| 4,371,801 | 2/1983 | Richter | 310/156 |
| 4,420,875 | 12/1983 | Coquillart | 29/597 |
| 4,551,645 | 11/1985 | Takahashi et al. | 310/46 |
| 4,743,813 | 5/1988 | Tassinario | 318/138 |
| 4,839,543 | 6/1989 | Beakley et al. | 310/12 |
| 5,146,144 | 9/1992 | Lee | 318/138 |
| 5,168,185 | 12/1992 | Umehara et al. | 310/15 |
| 5,304,884 | 4/1994 | Kitajima et al. | 310/198 |
| 5,396,140 | 3/1995 | Goldie et al. | 310/268 |
| 5,397,953 | 3/1995 | Cho | 310/254 |
| 5,589,722 | 12/1996 | Sakaguchi et al. | 310/180 |

*Primary Examiner*—Steven L. Stephan
*Assistant Examiner*—Timothy A. J. Williams
*Attorney, Agent, or Firm*—Ice Miller Donadio & Ryan; Jay G. Taylor

[57] ABSTRACT

Disclosed is a Segmented Coil Array ("SCA") for use in rotary electromotive devices, such as motors and generators, which employ multiple coils operating within an axial gap magnetic structure. Individual conductor coils have offset circumferentially extending portions so as to allow interlocking of adjacent coils radially extending portions to form a circular array in which all of the coils' working conductors, which are those in the axial magnetic field, can be oriented in the same plane. This construction allows minimum magnet gap spacing, thus, maximizing the available magnetic flux. The resulting SCA may easily be commuted as a three-phase motor, actuator, or generator. The invention also provides a structure whereby multiple coil arrays and associated magnetic rotors may be alternately stacked in layers so as to further increase the total coil working area within a motor or generator of a given diameter.

20 Claims, 10 Drawing Sheets

5,744,896

INTERLOCKING SEGMENTED COIL ARRAY

FIELD OF THE INVENTION

This present invention relates generally to electrical generator or motor structures and more specifically to brushless electromotive devices of the type which employ a flat coil array or structure operating within an axially-oriented magnetic field having flux lines mostly perpendicular to the working conductor portion of the coils. This may include disc or pancake rotary motors as well as linear motors having such flat coils and magnetic structure.

BACKGROUND OF THE INVENTION

Motors employing disc-shaped coil armatures and brush commutation have been in use since the late 1950's. Brushless disc-type motors were later developed, employing rotating magnets, coil stators and electronic commutation. Such motors have been used in large numbers in audio and video tape recorders and computer disc drives. In such a motor, a magnetic rotor disc with alternating North/South pole pieces rotates above and/or below a plane containing several flat, stator coils lying adjacent one another. Current flowing in the conductor wires of the coils interacts with the alternating magnetic flux lines of the disc, producing Lorentz forces perpendicular to the radially directed conductors and thus tangential to the axis of rotation. While current flows through the entire coil, only the radial extending portions of the conductors (called the working conductors) contribute to the rotor. See, for example, U.S. Pat. Nos. 3,988,024; 4,361,776; 4,371,801; and 5,146,144. A variation of this arrangement is known in which the circumferential portions (nonworking conductors) of the wire-wound coils overlap each other. See, for example, U.S. Pat. Nos. 4,068, 143; 4,420,875; 4,551,645; and 4,743,813. While this arrangement allows closer packing of the working conductors, it also requires that the gap between the rotor's magnets and flux return be about twice as thick as would be required for a single thickness of a non-overlapping coil, thus reducing the magnetic flux density and thus reducing the motor's efficiency.

SUMMARY OF THE INVENTION

In view of the well known disadvantages in the above-mentioned prior art, it is an object of the present invention to provide a novel coil structure which more efficiently provides electromotive interaction between these new coils and the magnets within a rotary motor or generator of the type having a generally flat, ring-shaped coil structure and employing an axial gap magnet structure, such as in disc or pancake motors, while minimizing the thickness of the coil and magnet flux gap. Specifically, the invention relates to the construction and shape of the individual coils making up a coil array (circular or arc-shaped arrangement of coils) so as to allow interlocking or overlapping of multiple coils to form a thin disc coil array having double the density of, but not significantly more thickness than, non-overlapping coil arrays. The radially extending conductor portions of each coil all lie in a first plane while the circumferentially extending portions of each coil's conductors lie above and below said first plane.

Another object of the present invention is to maximize the total length of the working conductors within a circular coil array by overlapping three adjacent coils, so as to maximize the electromotive interaction for a motor or generator of a given diameter. For any given device diameter, conductor cross-sectional area, and magnetic flux density, this technique maximizes the torque which may be produced by a motor, or the voltage produced by a generator.

Another object of the invention is to provide a mechanism whereby multiple coil arrays may be closely stacked with corresponding magnetic rotors in alternating layers so as to increase the total coil area within a motor or generator of a given diameter. This increased coil area allows increased interaction between coils and magnets, improving the power conversion with the motor or generator.

BRIEF DESCRIPTION OF THE DRAWINGS

While this specification concludes with claims particularly pointing out and distinctly claiming the subject matter which is now regarded as the invention, it is believed that the broader aspects of the invention, as well as several of the features and advantages thereof, may be better understood by reference to the following detailed description of presently preferred embodiments of the invention when taken in connection with the accompanying drawings in which:

FIG. 1b is an illustration of a prior art magnet rotor associated with the coil assembly of FIG. 1a;

DETAILED DESCRIPTION OF THE INVENTION

Figure 1A:
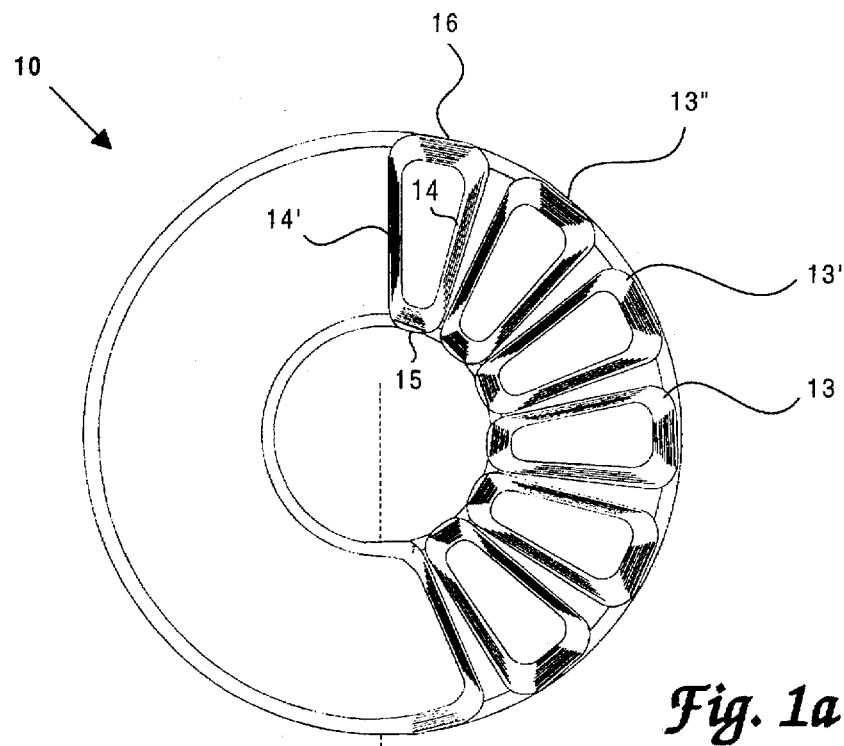
FIG. 1a is an illustration of a prior art (planer) coil assembly.
Figure 1B:
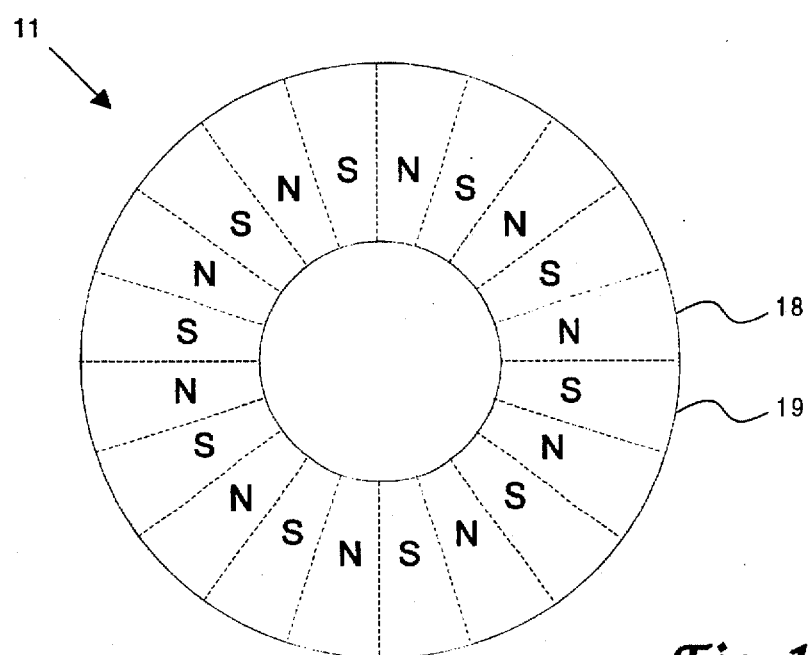

Referring now to the drawings and particularly to FIG. 1, there is shown a prior art planer coil assembly 10 and a magnet rotor 11 which may be used to make a typical prior art disc-type motor. This coil assembly 10 consists of several individual coils 13, 13', 13" arranged in a circular pattern, each coil 13 having two radially extending conductor portions or legs 14, 14', an inner circumferentially extending leg 15 and an outer circumferentially extending leg 16, all lying in a single plane. In a motor utilizing such a coil assembly, the magnet rotor 11, having alternating North/South poles 18, 19 arranged in a corresponding circular pattern and affixed to a central shaft (not shown), rotates in a plane closely adjacent to, but spaced slightly above and/or below, the plane containing the coils 13, 13', 13". While two magnet rotors 11 may be used, one on either side of the coil assembly 10, only one may be used if a magnetic flux return, such as a soft iron disc (not shown), is placed on the other side of the coil assembly opposite the rotor. In use, electrical current in the radially extending conductors 14,14' of the coil assembly 10 interacts with the alternating magnetic flux lines from the north 18 and south 19 poles of the rotor, producing Lorentz forces perpendicular to the radial conductors 14,14' and thus tangential to the rotor's 11 axis of rotation. While current flows through the entire coil 13, only the radial conductor legs 14, 14' (called the working conductors) contribute torque to the rotor 11 while the non-working legs 15, 16 merely complete a current path.

Figure 2:
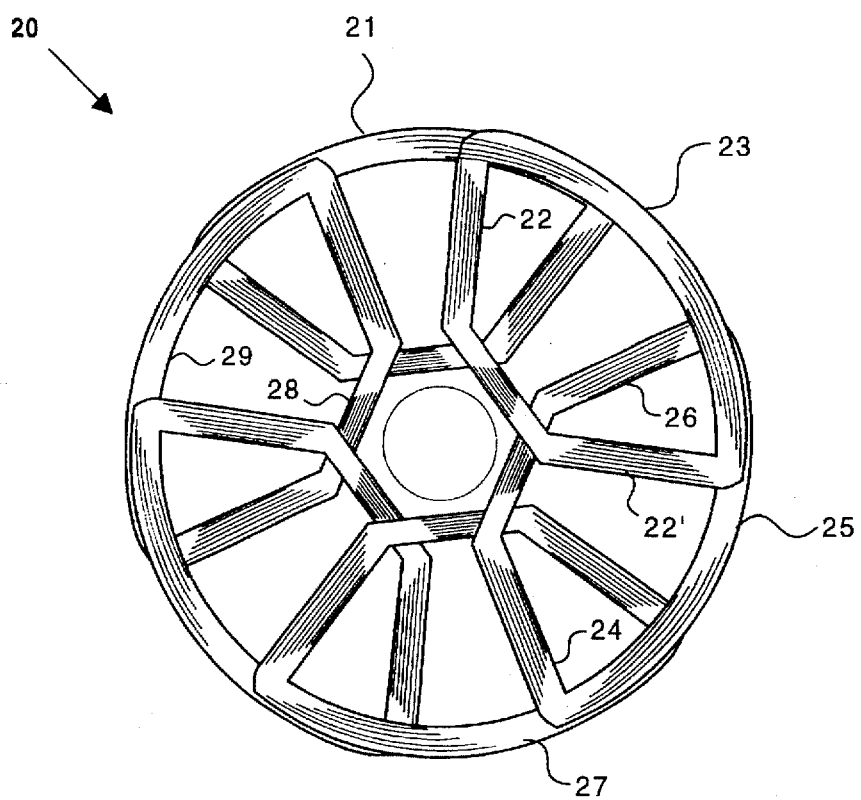
FIG. 2 is an illustration of another prior art (partially overlapping) coil assembly.

FIG. 2 shows a somewhat different prior art coil assembly 20 in which the working conductor legs 22, 22' of the wire-wound coil 23 overlap the adjacent coils 21, 25. Likewise, the radial legs 24, 26 of coil 25 overlap adjacent coils 23, 27. While this overlapping arrangement allows denser packing of the working conductors 22, 24, 26, it also requires that the spacing or gap between the rotor's magnets and flux return be twice as wide as would be required for a single thickness of the coil shown in FIG. 1.

Figure 3:
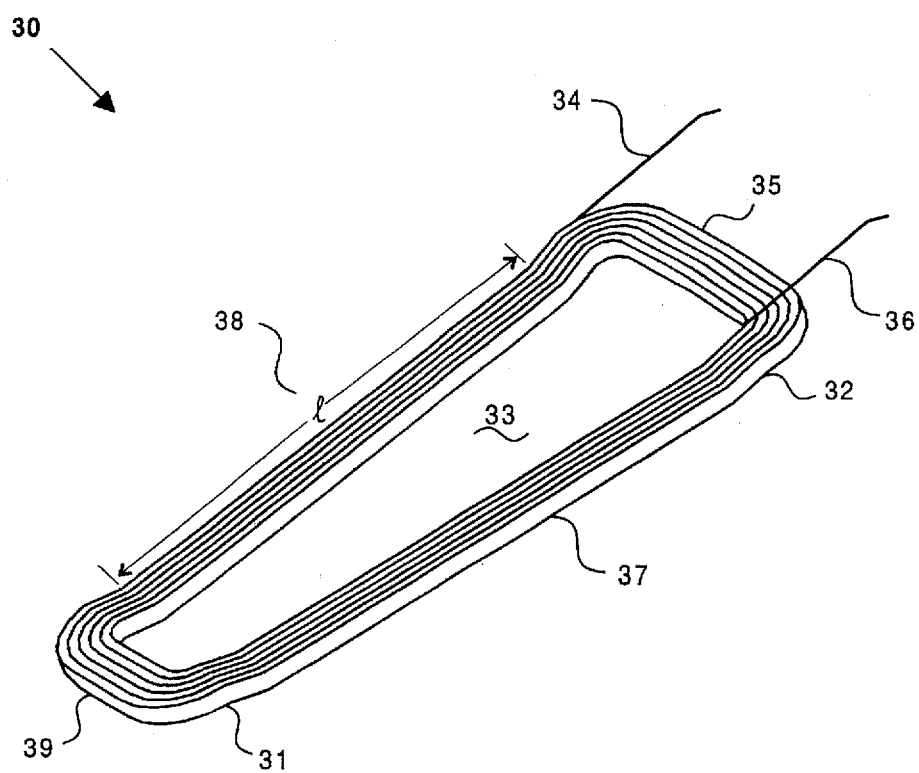
FIG. 3 is an illustration of a single wire-wound coil according to this invention.

FIG. 3 illustrates one individual coil 30 constructed according to the present invention. The coil 30 comprises round or flat conductor wire spirally wound in a keystone or trapezoidal shape defining a central open space 33. The open space 33 is bounded by two radially extending side portions or working legs 37 lying in a first plane, an outer circumferentially extending base portion 35 and an inner circumferentially extending base portion 39 lying in a second plane, parallel to but spaced apart from and above the first plane. As will be explained later, the open space 33 must be wide enough to accommodate two adjacent working legs 37. The electrically conducting coil leads 34, 36 extending from the outer circumference of the coil provide a means for applying an electrical current through the coil from an external source (not shown). Near each end of the radially extending legs 37 are offsetting bends 31 and 32 that provide the transition from the second plane to the first plane. These offsetting bends 31 and 32 are an important feature of the present invention and are required for the desired high density packing arrangement presented in FIG. 4 below. Between the offsetting bends 31 and 32 is working portion 38 of the coil's radially extending legs 37 to which magnetic flux is applied during use by an adjacent magnet rotor 11. The length 1 of this working portion 38 is called the working length. Preferably, the working length 1 of the individual coils are optimized for maximum torque or voltage production by ensuring that such working length 1 is about 42% of the distance from the center of the coil platter to the outer point of the coil working length, which distance is called the critical radius of the platter.

Figure 4:
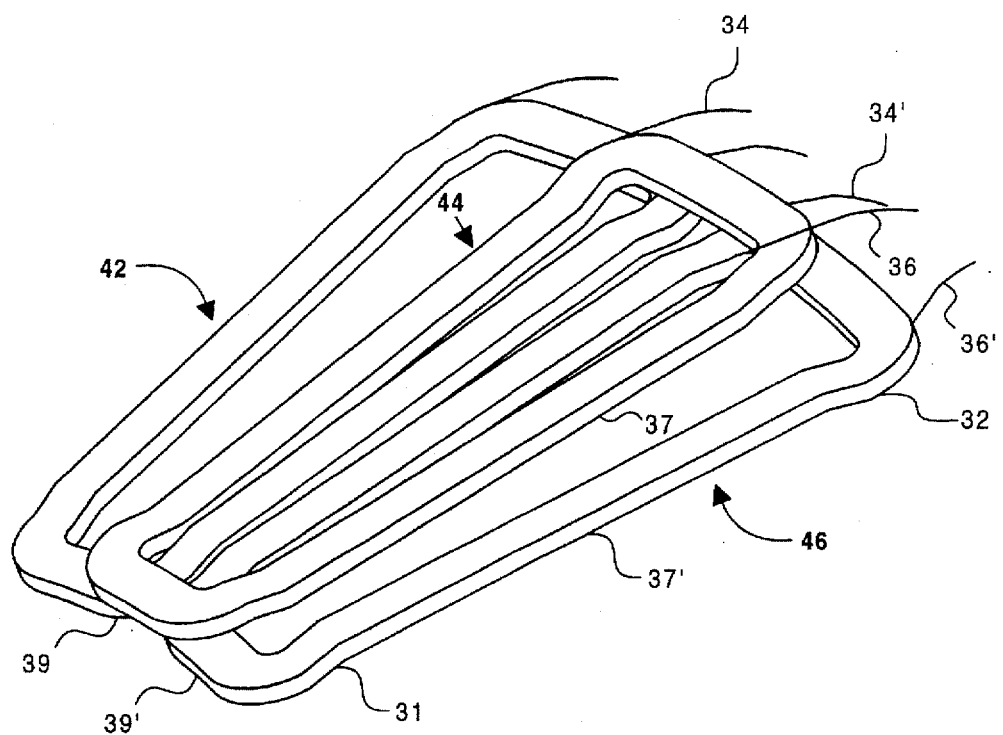
FIG. 4 is an illustration of three coils of FIG. 3, overlapped in their proper orientation according to this invention.

As one example of a preferred embodiment, FIG. 4 shows three typical coils 42, 44, 46 which would be arranged with 45 others in the same manner to form an assembly of 48 coils for this particular diameter array. The coils are arranged such that the working portions 38 of each coil are all in the same first plane and the central open space 33 of one coil 44 (between its working legs 37) is filled by one working leg 37' from each of the adjacent coils 42, 46. The rest of the coil 44 (mostly the inner 39 and outer 35 circumferentially extending portions) cannot reside in the same first plane because it would require parts of different coils to pass through the same space. This is the reason the offsetting bends 31 and 32 are important, so that the ends will lie in a second (and third) plane whereby the coils may be nested to achieve a high density.

Figure 5:
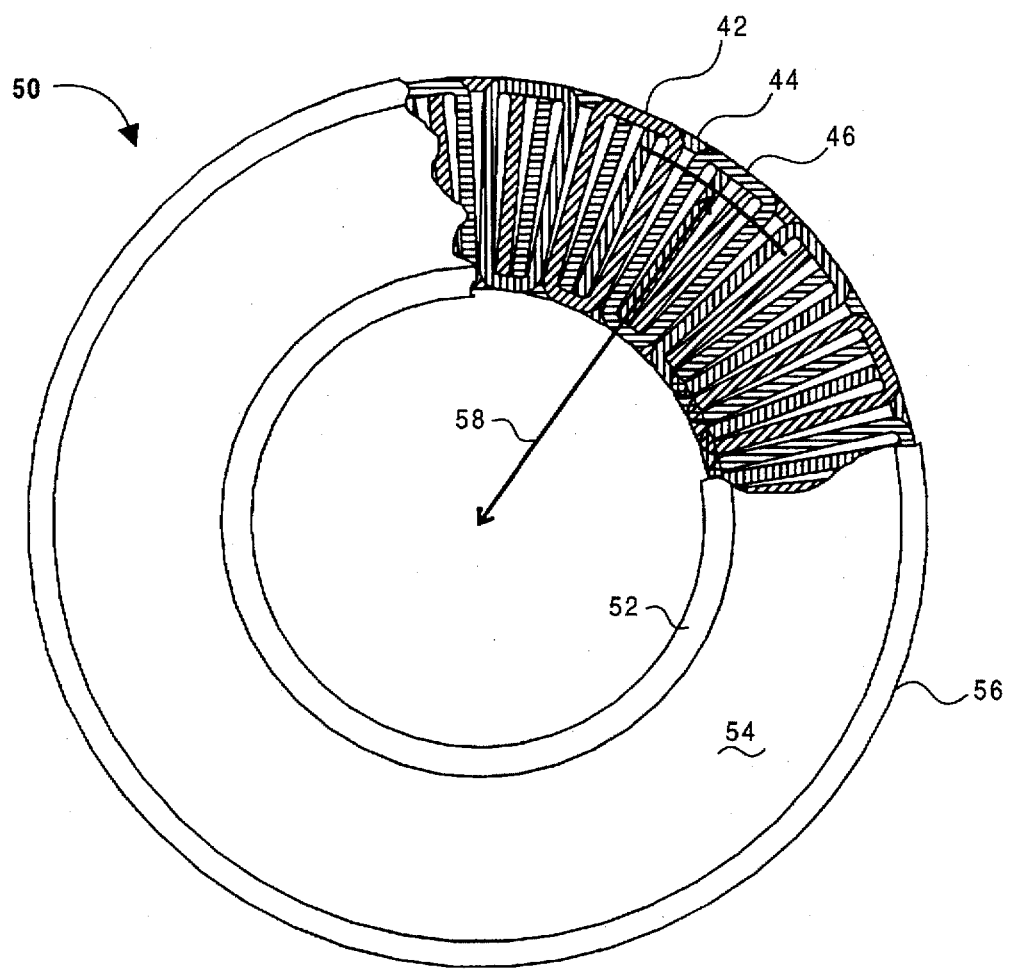
FIG. 5 is an illustration of a Segmented Coil Array ("SCA") coil platter, with a partial cutaway showing the multiple internal coils of FIG. 3, according to this invention.

A complete array of coils, affixed to each other and/or to a suitable structural material to form a coil platter (or an arc-shaped portion of the total coil platter) may be referred to as a Segmented Coil Array ("SCA"). A complete coil platter 50 is depicted in FIG. 5. (This particular illustration does not show the coil leads 34, 36 for clarity.) This SCA platter 50 is composed of 48 individual coils 30 molded into an epoxy resin or other easily moldable material for support, which optionally may be further strengthened by also molding in layers of fiber reinforcing fabric. Since the inner 39 and outer 35 ends of each coil 30 lie in planes slightly above and below a first plane containing the working legs 37, the molded platter 50 has a thin center face 54 with a thicker inner rim 52 and outer Tim 56. Any other even numbers of coils other than 48 may also be used in an SCA, depending on the electrical or mechanical properties desired.

It has been discovered that for a given SCA diameter, the working length of the individual coils may be optimized for maximum torque production, in a motor, or voltage production, in a generator. This is done by making the coil working length 42% of the critical radius. The critical radius 58 is indicated in FIG. 5 and is defined as the distance from the center of the coil platter to the outermost points of the working length, before reaching the outer rim 56.

Figure 6:
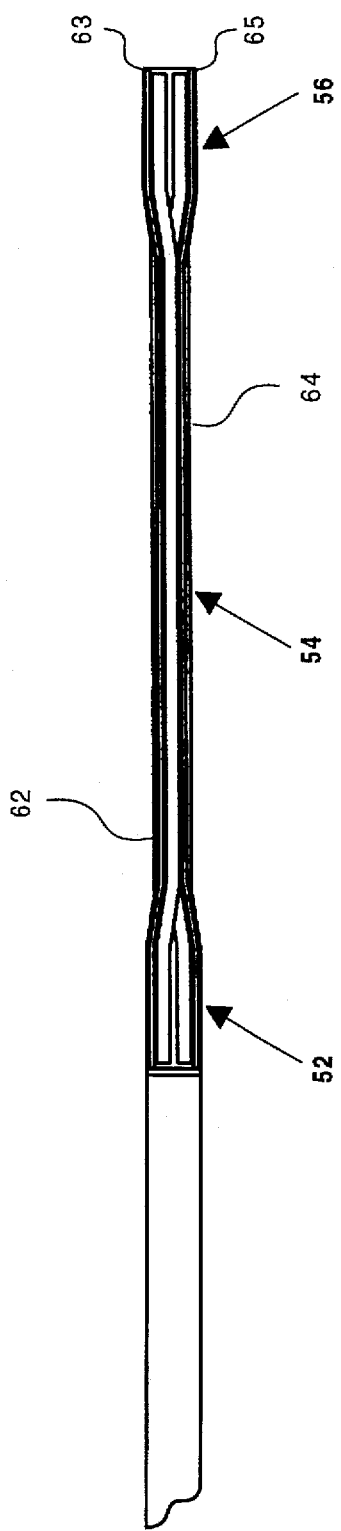
FIG. 6 is an enlarged cross-sectional illustration of the SCA platter of FIG. 5.

A cross section of a portion of the coil platter 50 of FIG. 5 is illustrated in FIG. 6. Preferably, the exterior surface of the center face 54 is coated with one or two layers of PFTE 62, 64 to provide abrasion resistance and low friction characteristics. Similarly, one or two pieces of thin fiberglass cloth 63, 65 may be added over the coils, under PFTE, to further increase strength and stiffness of the platter.

Figure 7:
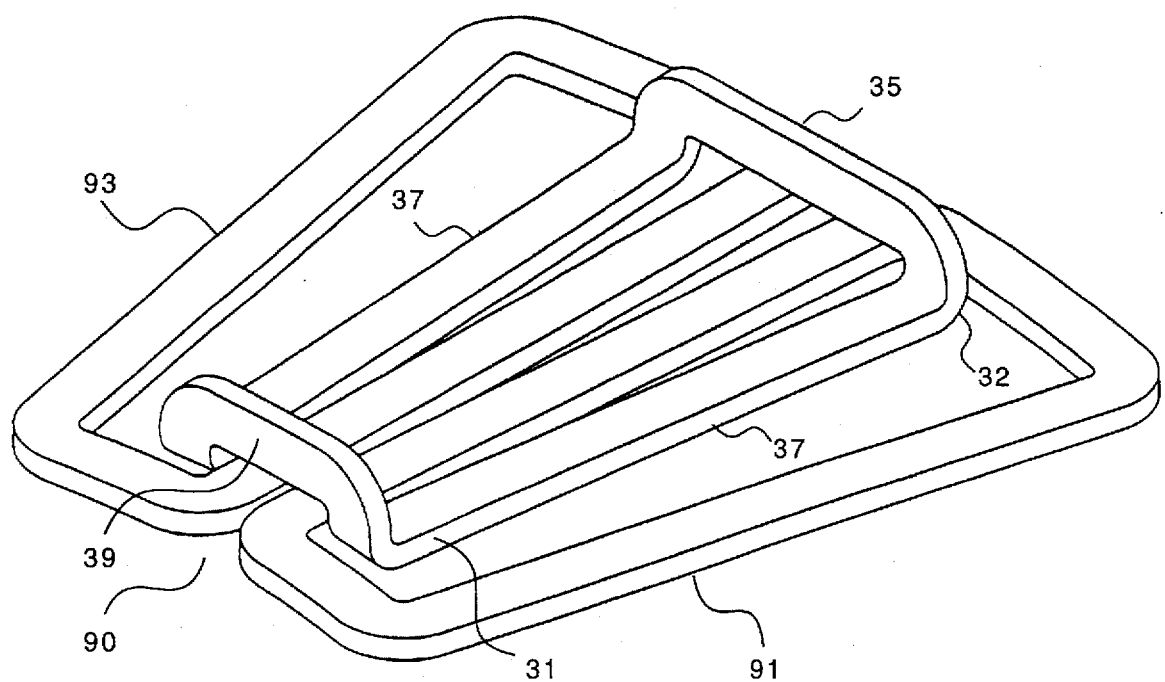
FIG. 7 is an illustration of three coils of an alternative embodiment of the present invention, overlapped in their proper orientation according to this invention.

FIG. 7 illustrates three coils of an alternative coil configuration 90. An SCA formed with alternative coil configuration 90 is comprised of a first and a second multiplicity of coils of equal number. The coils of the first multiplicity of coils (e.g. coils 91, 93) are formed and circumferentially oriented to lie in a first plane. The coils of the second multiplicity of coils are formed such that the working legs 37 of each coil lie in a first plane, and the outer circumferentially extending base portion 35 and inner circumferentially extending base portion 39 of each coil lie outside the first plane. As previously described with regard to the coil configuration embodiment depicted in FIG. 3, offsetting bends 31 and 32 near each end of the radially extending legs 37 of the coils of the second multiplicity of coils provide the transition of the base portions 35 and 39 from the first plane to outside the first plane. FIG. 7 depicts the angles of the offsetting bends 31 and 32 as being approximately 90 degrees in this alternative coil configuration 90, but any angle of the offsetting bends 31 and 32 sufficient to allow the first and second multiplicity of coils to nest as depicted such that the working legs 37 of all coils of both the first and second multiplicity of coils lie substantially in a single plane is acceptable.

Figure 8:
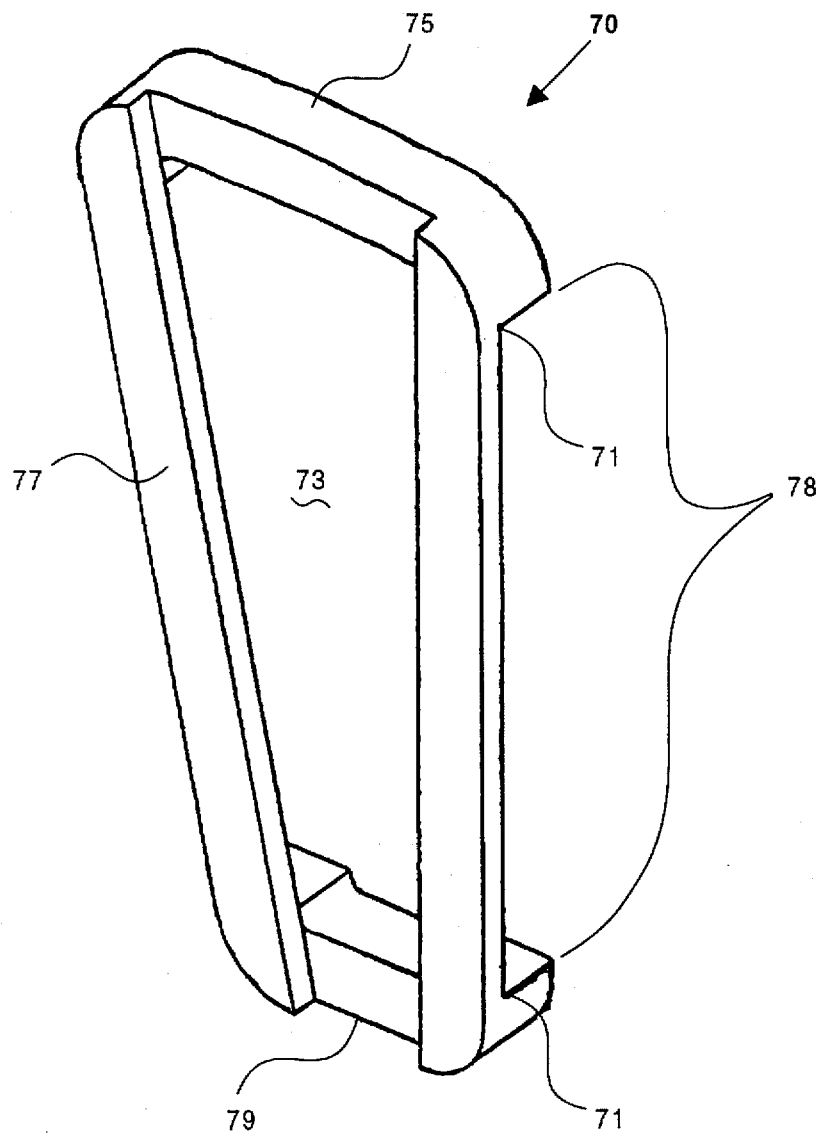
FIG. 8 is an illustration an alternate form of coil having lower resistive losses.

FIG. 8 illustrates yet another alternate coil configuration 70 useful with the present invention and having lower electrical losses than coil 30 above. The coil 70 comprises flat conductor wire or ribbon (i.e. having a rectangular cross-section) spirally wound to form a basic keystone or trapezoidal shape surrounding a central open space 73, much like coil 30 above. The open space 73 is, like in coil 30, bounded by two radially extending portions or working legs 77 lying in a first plane, an outer circumferentially extending base portion 75 and an inner circumferentially extending portion 79 lying in a second plane, parallel to but spaced apart from the first plane. In contrast to the offsetting bends 31 of coil 30 that provide a gradual transition from the first plane of the radial legs to the second plane of the base portions, the low-loss coil 70 is machined after winding so that there are abrupt offsetting steps 71 near each end of the radially extending legs 77. Further, sufficient material is machined away from the radially extending legs 77 so that, at least over the working length 78, the legs 77 have a smaller cross-sectional area than the base portions 75, 79. The electrical resistance in the larger base portions 75, 79 of coil 70 will be less than in corresponding base portions 35, 39 of coil 30, when both have the same sized working legs, thereby reducing the $I^2R$ losses of coil 70. As explained earlier, the open space 73 must be wide enough to accommodate two adjacent working legs 77 to achieve the high density nesting shown in FIG. 4. Coil leads would typically extend from the outer circumference of the coil, but are not shown here to improve clarity.

Figure 9:
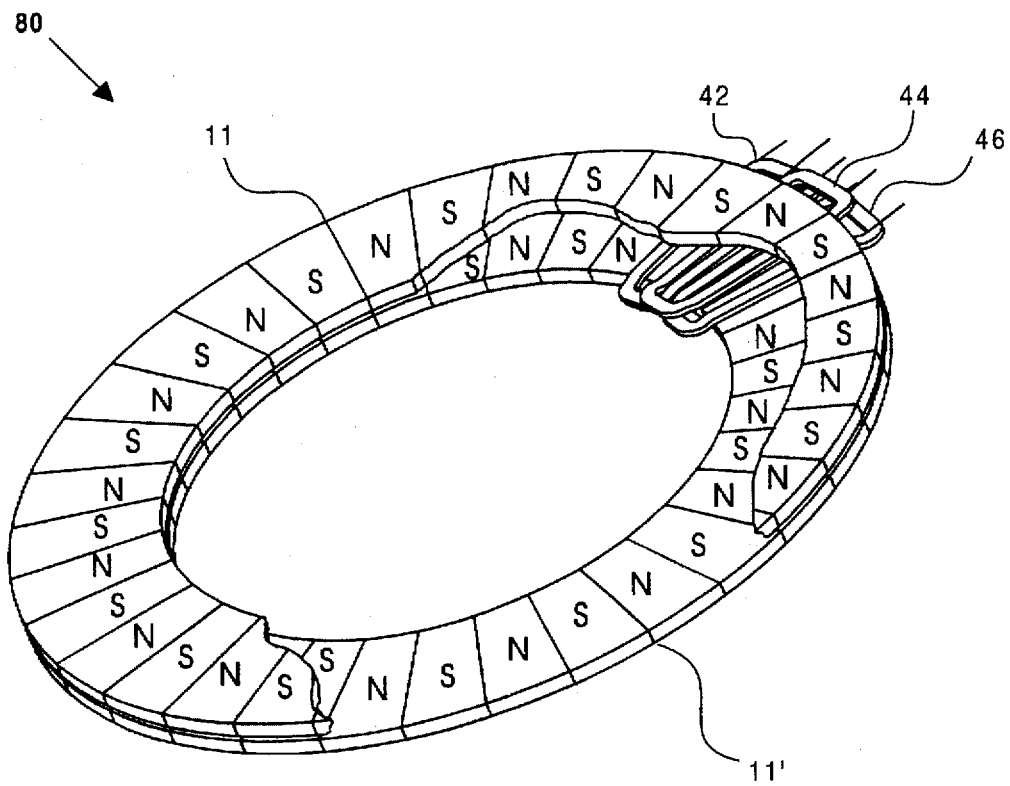
FIG. 9 illustrates a basic electromotive device showing three nested coils in their proper orientation to two adjacent magnet rotors.

In operation within a typical electromotive device, a circular coil platter 50 is exposed to an axially directed magnetic flux produced by a magnet rotor 11, i.e. flux perpendicular to the plane containing the coils' working lengths. One such way of providing this flux is illustrated in FIG. 9 in which a magnet rotor 11 (which could be composed of permanent magnet segments or electromagnets and which would be affixed to a central rotatable shaft, not shown) is positioned adjacent one or both sides of the coil platter to form a basic electromotive device 80. If only one magnet 11 is used in a particular device, some type of flux return, such as a soft iron disc, should be placed adjacent the opposite side of the coil platter. Here, only three coils 42, 44, 46 of an entire platter 50 of 48 coils 30 are shown for clarity in this example. As the coils are appropriately energized (by any well known control circuit, not shown), a rotating force or torque is produced in the magnet rotor(s). Depending on the results desired and the corresponding mechanical arrangement, the magnet rotor may cause a shaft to revolve at high speed or merely turn a small angle at high torque.

Figure 10:
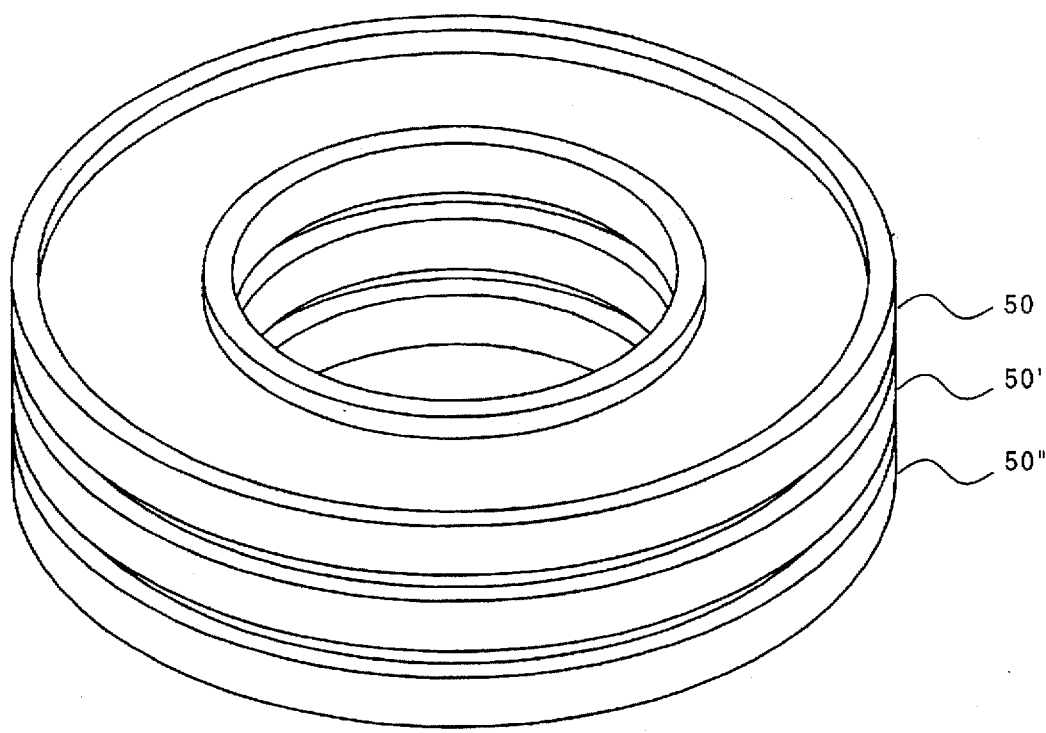
FIG. 10 is an illustration of three coaxially stacked SCA coil platters of FIG. 5 suitable for use in an electromotive device.

As illustrated in FIG. 10, it is beneficial to stack multiple coil platters 50, 50', 50" along a common central axis with alternating layers of magnetic rotors 11. This arrangement increases the total working area, and thus the power, within an electromotive device of given diameter. For clarity, the coil leads and magnet rotors are again not shown in FIG. 10. The details of various possible mechanical arrangements to adapt the present invention to common industrial devices are so well known that they need not be discussed here.

While the present invention has been described in terms more or less specific to preferred embodiments, it is expected that various alterations, modifications, or permutations thereof will be readily apparent to those skilled in the art. For example, the invention may be embodied in an electrical generator as well as a motor. Instead of a circular coil array, the coils of the invention may be formed into a linear array or a partial circle rather than a complete circular array. Therefore, it should be understood that the invention is not to be limited to the specific features shown or described, but it is intended that all equivalents be embraced within the spirit and scope of the invention as defined by the appended claims.

What is claimed is:

1. A segmented coil array for use in rotary electromotive devices with one or two magnet rotors, such as motors and generators, of the type which employ an axial gap magnetic structure, composed of an even multiple of individual wire-wound coils, each coil having substantially the same structure and size and comprising circumferentially extending base portions and radially extending side portions, the radially extending side portions and circumferentially extending base portions joined at their respective ends to define a generally trapezoidal shape: the coil array formed into a ring of partially overlapped alternating coils such that the radially extending side portions of each coil are coplanar.

2. The coil array of claim 1 wherein each individual coil has offsetting bends near each end of said radially extending side portions which cause the circumferentially extending base portions of the coil to lie outside the plane containing the radially extending side portions so as to allow partial overlapping of each coil by its two adjacent coils.

3. A segmented coil array, according to claim 2, in which each coil's circumferentially extending base portions and radially extending side portions define a space containing one radially extending portion from each of its two adjacent coils thereby doubling the density of the coil's working conductors.

4. The coil array of claim 1 wherein a plurality of the individual coils have offsetting bends near each end of said radially extending side portions which cause the circumferentially extending base portions of the coil to lie outside the plane containing the radially extending side portions so as to allow partial overlapping of each coil by at least two adjacent coils.

5. A segmented coil array, according to claim 1, in which the individual coils are over-molded with a moldable material to form a ring of suitable structural integrity and heat tolerance.

6. The segmented coil array of claim 5 in which the moldable material is epoxy.

7. The segmented coil array of claim 5 additionally comprising layers of fiber reinforcing fabric.

8. A segmented coil array, according to claim 1, wherein the coils are oriented to form a linear array.

9. A segmented coil array, according to claim 1, wherein the coils are oriented to form a partial ring.

10. The coil array of claim 1 wherein the individual coils are formed such that the radially extending side portions of a coil have a smaller cross-sectional area than at least one of the circumferentially extending base portions.

11. The coil array of claim 1, wherein the multiple individual wire-wound coils affixed to each other form a coil platter, having a central axis and known inner and outer diameters, in which the radially extending coil portions are the working conductors, and the working length of said conductors is approximately 42% of the distance between the central axis of the coil platter and the outer diameter of the coil's working length, thereby optimizing the array for maximum torque, when used in a motor, or voltage production, when used in a generator.

12. The coil array of claim 1, wherein the coil array is operably located in a rotary electromotive device, such as a motor or generator, the motor or generator having alternating layers of magnetic material to produce an axial gap magnetic structure, and further having several additional coil arrays arranged in layers of electromagnetic coil arrays which are stacked so as to further increase the total coil area within said electromotive device, each layer of coil structure operating in a separate axial magnetic flux gap formed by the layers of magnetic material.

13. The device of claim 12 wherein said magnetic material is a disc shaped permanent magnet rotor affixed to a rotatable shaft.

14. The device of claim 12 wherein said magnetic material is a disc shaped electromagnet rotor affixed to a rotatable shaft.

15. A segmented coil array for use in rotary electromotive devices, such as motors and generators, of the type which employ an axial gap magnetic structure, comprising an even multiple of identically shaped individual wire-wound coils, each coil comprising circumferentially extending base portions, and radially extending side portions joined at their respective ends to form a trapezoid shape, each side portion having offsetting bends at each end of said side portion adjacent to each base portion so that said base portions lie in a plane parallel to said side portions; the coil array formed by arranging a first set of coils into a ring with side portions being adjacent, and overlapping a second set of coils such that the radially extending side portions of each set of coils are all coplanar and the offsetting bends of alternate coils are oriented in different directions so that the base portion of the first set of coils are parallel to the base portions of the second set of coils.

16. A segmented coil array, according to claim 15, in which the individual coils are over-molded with a moldable material to form a ring of suitable structural integrity and heat tolerance.

17. The segmented coil array of claim 16 in which the moldable material is epoxy.

18. The segmented coil array of claim 15 additionally comprising layers of fiber reinforcing fabric.

19. The coil array of claim 15 wherein the individual coils are formed such that the radially extending side portions of a coil have a smaller cross-sectional area than at least one of the circumferentially extending base portions.

20. The coil array of claim 15, wherein the multiple individual wire-wound coils affixed to each other form a coil platter, having a central axis and known inner and outer diameters, in which the radially extending side portions include a working length, and the working length is approximately 42% of the distance between the central axis of the coil platter and the outer diameter of the coil's working length, thereby optimizing the array for maximum torque, when used in a motor, or voltage production, when used in a generator.

* * * * *